Oct. 7, 1952  A. T. C. BURROWS  2,612,847
CONVEYER SYSTEM
Filed Jan. 19, 1950  2 SHEETS—SHEET 1

INVENTOR
ARTHUR T. C. BURROWS
By: Haseltine, Lake & Co.
AGENTS

Oct. 7, 1952 A. T. C. BURROWS 2,612,847
CONVEYER SYSTEM
Filed Jan. 19, 1950 2 SHEETS—SHEET 2

INVENTOR
ARTHUR T. C. BURROWS
By: Haseltine, Lake & Co.
AGENTS

Patented Oct. 7, 1952

2,612,847

UNITED STATES PATENT OFFICE 2,612,847

CONVEYER SYSTEM

Arthur Thomas Charles Burrows, Hitchin, England, assignor to Geo. W. King Limited, Hitchin, England, a British company Application January 19, 1950, Serial No. 139,500
In Great Britain January 31, 1949

9 Claims. (Cl. 104—91)

This invention relates to conveyor systems of the type wherein load carrying trolleys are propelled along a track by virtue of the engagement therewith of pusher dogs or driving abutments carried by a driving chain which is itself suspended from trolleys adapted to run on a second track disposed above that on which the load carrying trolleys are caused to run.

It is the chief object of the invention to evolve a conveyor system of the type set forth wherein load carrying trolleys may be arrested for loading, unloading or storage purposes at one or more points along the conveyor path without interrupting the continuity of the drive to the driving chain of the conveyor and without the possibility of jamming or collision occurring between the arrested trolley or trolleys and those succeeding the same, or any other dislocation of the system.

In accordance with the invention means are provided operable automatically, on stoppage of a load carrying trolley, to cause the pusher dogs or driving abutments engaging the succeeding trolley or trolleys to be moved out of engagement therewith so that the drive to said succeeding trolley or trolleys will be discontinued. Preferably, positive stop means are also provided adapted, on discontinuance of the drive to a trolley, to move automatically into the path of the latter positively to prevent further movement thereof, such means being moved automatically to an inoperative position on return of the pusher dogs to their operative position to continue the drive to the trolley.

In accordance with a further aspect of the invention in a conveyor system of the type set forth means are provided adapted, on stoppage or arrest of one load carrying trolley at a predetermined station on the conveyor path, to effect stoppage of one or more succeeding trolleys at one or more predetermined stations preceding that at which the first trolley is stopped, the arrangement being such that, upon release of the first trolley, such succeeding trolleys as have been arrested will be moved forward automatically by one station.

In order that the invention may be clearly understood and readily carried into effect the same will be hereinafter more fully described with reference to the accompanying diagrammatic drawings in which.

Figure 1:
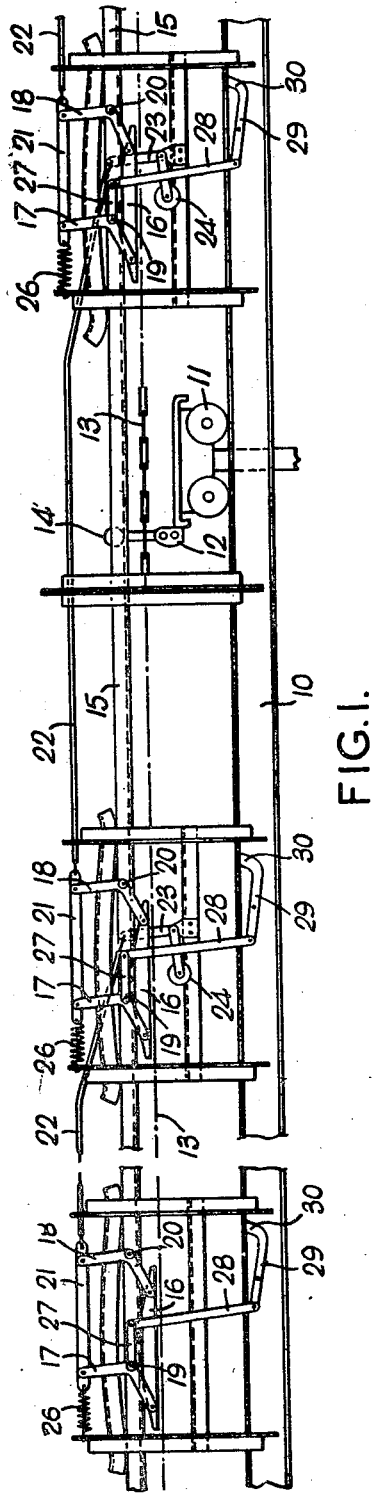
Figure 1 shows in side elevation a section of a conveyor having the control mechanism according to the invention applied thereto.

Referring to the drawings, it will be seen that the conveyor system to which the control mechanism according to the invention is applied comprises a fixed track 10 made up of two parallel rail or track members along which load carrying trolleys are adapted to run, said trolleys, which are indicated at 11, being positively propelled along the track by virtue of the engagement therewith of pusher dogs or driving abutments 12 which are carried by a driving chain 13, itself suspended by trolleys 14, hereinafter referred to as chain trolleys, running on a track 15 made up of two parallel rail or track members and disposed above the track 10 on which the load carrying trolleys 11 are adapted to run. Such a system is well known and will not be further described herein. It will be assumed that in such a system means are provided at a pre-determined point in the conveyor path, such point being hereinafter referred to as the "final station," adapted on operation to arrest any load carrying trolley 11, means also being provided which are adapted to raise the driving chain in the region of the final station so that the pusher dogs 12 will lift out of engagement with any trolley held at said final station. It will be appreciated that upon stoppage of a trolley 11 at the final station it is necessary, unless the drive to the driving chain 13 is discontinued, to provide some means where succeeding trolleys 11 may be arrested at predetermined points preceding such station in order to avoid collision between the trolleys and jamming of the system. It is with this problem that the present invention is concerned and in accordance with the invention storage or holding stations are located along the conveyor paths at points preceding the final station, such storage or holding stations being preferably arranged at smaller centre distances apart than are the pusher dogs 12 on the driving chain in order to avoid gaps in the system.

Figure 2:
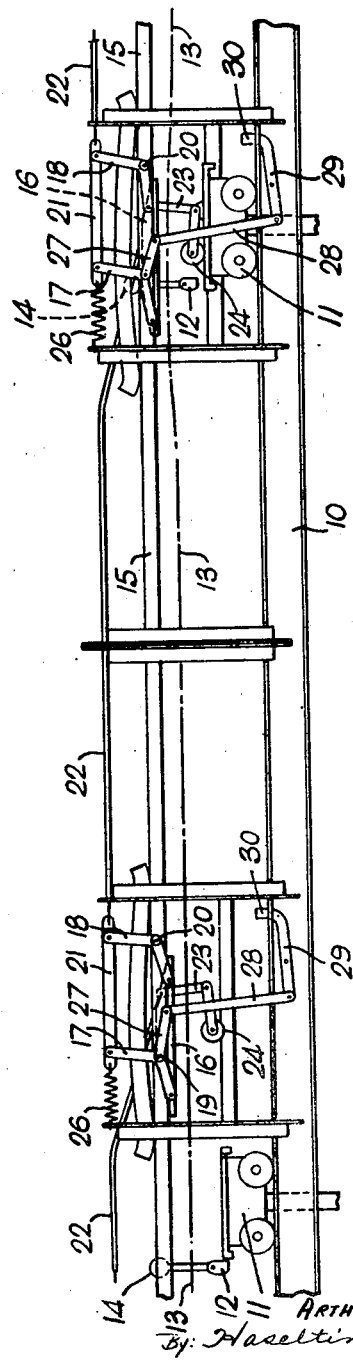
Figure 2 is a view similar to that shown in Figure 1 but illustrating the operation of the mechanism.
Figure 4:
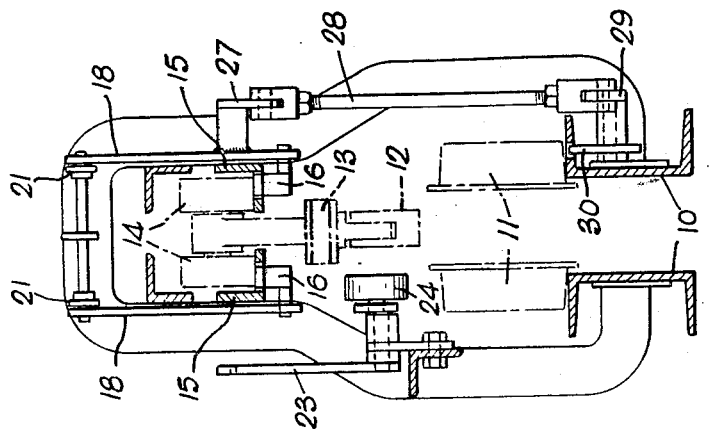
Figure 4 is an end view of the mechanism shown in Figure 3.
Figure 3:
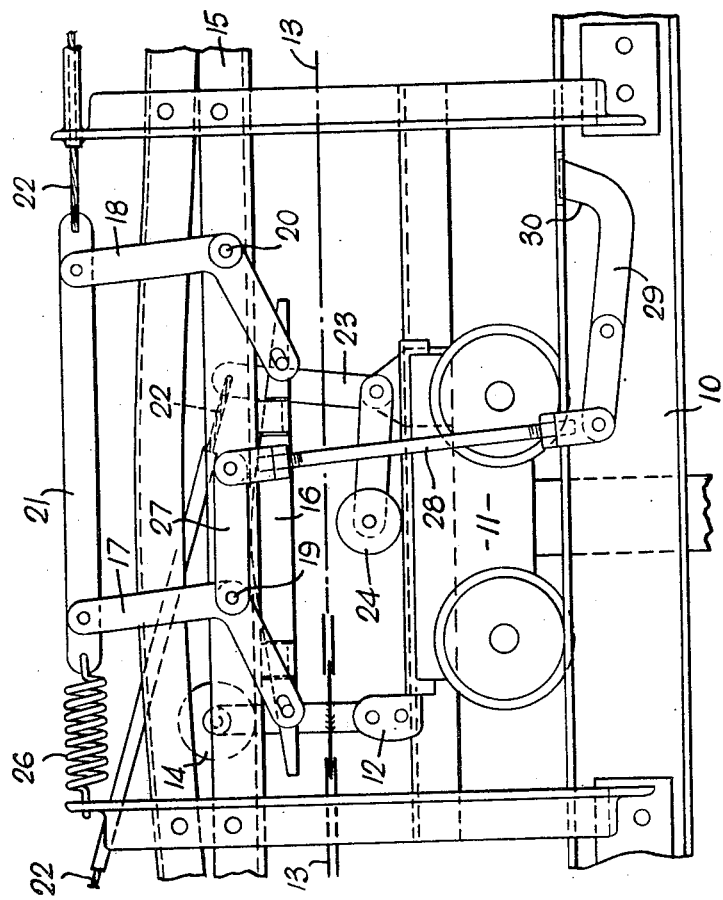
Figure 3 is a side elevational view on a larger scale of one of the various control mechanisms illustrated in Figures 1 and 2.

At each storage or holding station, of which several are indicated in Figures 1 and 2, a pair of ramps or the like 16 is provided, one in respect of each of the chain trolley track members 15, said ramps being movable into the path of the chain trolleys 14 so as to cause the latter to be lifted and thereby to cause the chain 13 to be raised, as indicated at the right hand end of Figure 2, so that the pusher dogs 12 will be lifted clear of the load carrying trolley 11 at that station. The arrangement is such that the ramps at one station will be actuated automatically in the event of there being a load carrying trolley at the next station forward or, in other words, if a load carrying trolley is held at the final station means will be operated by the trolley at that station to effect operation of the ramps 16 at the next preceding station and hence discontinuance of the drive to the next succeeding trolley 11. A plurality of such stations may be provided at spaced points preceding the final station the ramps 16 at each being operated by the next forward station so that as the next forward station is cleared of a trolley 11 the trolley at the preceding station will be moved up to take its place. The ramps 16 at each station are arranged parallel to each other and so disposed as to co-operate one with each chain trolley track member 15. In the embodiment illustrated, the said track members 15 are slotted to allow the ramps to be raised and lowered therethrough. Each ramp 16 is carried by a pair of bell crank levers 17, 18 which are mounted for pivotal movement about fixed pivot points 19 and 20 respectively. One arm of each lever 17, 18 is pivotally connected at or adjacent its outer end to the ramp 16 while the second arm is pivotally connected at or adjacent its outer end to a common link 21, the arrangement being such that on pivotal movement of the levers 17, 18 the ramp 16 and the link 21 will have a parallel or substantially parallel motion. Associated with the links 21 associated with each pair of ramps is a cable 22 which is supported in suitable guides and extends forwardly to a ramp operating lever 23 disposed at the next forward station. The ramp operating lever 23 comprises a bell crank or other suitably shaped lever which is pivotally mounted in any convenient manner and one arm of which carries a roller or the like 24, while the other is connected at or adjacent its outer end to the cable 22, above referred to. The ramp operating lever 23 is so disposed that as a load carrying trolley 11 approaches the station an appropriate portion of said trolley will engage with the roller 24 or the like, thereby causing the ramp operating lever 23 to be rocked about its pivot to cause the cable 22 to be pulled to effect operation of the linkage system, i. e. the links 21 and levers 17 and 18 associated with the ramps 16 at the preceding station and movement of said ramps into their operative position to effect raising of the driving chain 13 of the conveyor at that station. Suitable tension springs 26 are associated with the linkage systems carrying the respective ramps so that on movement of a trolley out of the path of a ramp operating lever 23, the appropriate spring 26 will return its associated linkage system and the ramp operating lever to their initial positions, thus lowering the ramps 16 and allowing the trolley at the preceding station to be moved to the next forward station where it will contact the ramp operating lever 23 to reactuate the ramps 16 at the preceding station.

It will be appreciated that it will be necessary to provide ramps or equivalent devices at the final station, in order to cause the driving chain to be lifted so that the pusher dogs will be caused to ride over the top of any trolley held at such station. Such ramps or the like may be maintained permanently in position or they may be so mounted that they are movable through the medium of suitable electrical or mechanically operated means into and out of an operative position as required. In the case where the ramps are permanent the trolleys will be propelled manually when it is desired to feed from the "final" station. It will not however be necessary to provide a ramp actuating lever 23 at the first storage or holding station, i. e. the station remote from the final station.

Means are also incorporated adapted, on actuation of the ramps 16 at any one station, to project positive stop means into the path of the trolley 11 at that station in order to prevent continued motion of said trolley, due to its momentum, despite discontinuance of the actual drive thereto. In the embodiment illustrated, such means comprise an arm 27 movable angularly on pivotal movement of the bell crank lever 17 associated with each ramp 16 said arm being pivotally connected at its outer or free end to a depending rod 28 which is pivotally connected at its lower end to a pivoted lever 29 having an upturned nose or abutment 30 adapted on actuation of said lever to project into the path of the load carrying trolley 11 and to constitute a stop therefor. The arrangement above described is such that on operation of the ramps 16 the rod 28 will be operated to effect projection of the stop 30 into the path of the trolley, while on return of said ramps 16 to their inoperative position the stop 30 will similarly be automatically withdrawn from the path of the load trolley to allow forward movement thereof.

I claim:

1. In a conveyor system wherein load carrying trolleys are propelled along a main track by means of pusher dogs carried by a driving chain which is itself suspended from trolleys adapted to run on a second track disposed vertically above that on which the load carrying trolleys are caused to run such system also incorporating means for arresting any load trolley at a selected station in the conveyor path and means whereby the pusher dogs will be caused to move out of contact with any trolley so arrested thereby to discontinue the drive to the latter without interruption of the drive to said driving chain, the provision of indexing means comprising a pivoted actuating member adapted to be actuated by a load trolley on arrival at the aforesaid station, chain lifting means located at a point in the conveyor path preceding said station, said means being normally inoperative but adapted on actuation to lift the driving chain, a mechanical connection between said pivoted actuating member and said chain lifting means whereby the latter will be rendered operative on actuation of said pivoted actuating member by a trolley thereby to cause the drive to the next following trolley, to be discontinued, a pivoted stop member disposed adjacent the main track and at a point in the conveyor path adjacent said chain lifting means and means whereby actuation of said chain lifting means will result in projection of the stop member into the path of said next following trolley thereby positively to stop the same when the drive thereto is discontinued, the arrangement being such that on release of the first mentioned trolley from the station the pivoted actuating member will be returned to its initial position thereby to allow the chain lifting means and the stop member to be rendered inoperative and the drive to the next following trolley restored.

2. In a conveyor system as claimed in claim 1 the provision of a plurality of chain lifting means and pivoted stop members at spaced points along the conveyor path preceding the station and of means whereby each set of chain lifting means and its associated stop member will be rendered operative by stoppage of a trolley at the immediately preceding set.

3. In a conveyor system wherein load carrying trolleys are propelled along a main track by means of pusher dogs carried by a driving chain which is itself suspended from trolleys adapted to run on a second track disposed vertically above that on which the load carrying trolleys are caused to run, such system also incorporating means for arresting any load trolley at a selected station in the conveyor path and means whereby the pusher dogs will be caused to move out of contact with any trolley so arrested thereby to discontinue the drive to the latter without interruption of the drive to said driving chain, the provision of indexing means comprising a pivoted actuating member adapted to be actuated by a load trolley on arrival at the aforesaid station, a pair of ramp members located at a point in the conveyor path immediately preceding said station, a lever system supporting said ramp members and adapted on operation to project the same into the path of the chain carrying trolleys on said second track thereby to effect lifting of the chain, a mechanical connection between said pivoted actuating member and said lever system whereby the latter will be rendered operative to cause projection of the ramp members on actuation of said pivoted actuating member by a trolley thereby to cause the drive to the next following trolley to be discontinued, a pivoted stop member disposed adjacent the main track and at a point in the conveyor path adjacent said ramp members and means whereby actuation of said ramp members will result in projection of the stop member into the path of said next following trolley thereby positively to stop the same when the drive thereto is discontinued, the arrangement being such that on release of the first mentioned trolley from the station the pivoted actuating member will be returned to its initial position thereby to allow the chain lifting means and the stop member to be rendered inoperative and the drive to the next following trolley restored.

4. In a conveyor system as in claim 3 the provision of a plurality of ramp members together with their supporting lever systems and stop members at spaced points along the conveyor path preceding the station and of means whereby each set of ramp members and its associated stop member will be rendered operative by stoppage of a trolley at the immediately preceding set.

5. In a conveyor system as claimed in claim 3 the provision of resilient means which are associated with the lever system and are adapted to impart a reverse motion thereto to effect withdrawal of the ramp members from their operative position on movement of a trolley out of the path of the pivoted actuating member.

6. A conveyor system as claimed in claim 3 wherein the ramp members are supported by a pair of bell crank levers, a common link being pivotally connected to said levers to extend in substantially parallel relationship to said ramp members and a rod or cable connecting said link with said pivoted actuating member.

7. In a conveyor system wherein load carrying trolleys are propelled along a main track by means of pusher dogs carried by a driving chain which is itself suspended from trolleys adapted to run on a second track disposed vertically above said main track such system also incorporating means for arresting any load trolley at a selected station in the conveyor path, and means whereby the pusher dogs will be caused to move out of contact with any trolley so arrested thereby to discontinue the drive to the latter without interruption of the drive to said driving chain, the provision of indexing means comprising a pivoted actuating member adapted to be actuated by a trolley on arrival at the aforesaid station, a plurality of sets of control mechanisms located at spaced points along the conveyor path preceding said station each set of mechanisms incorporating a pair of ramp members adapted on actuation to be projected into the path of the chain carrying trolleys on the second track thereby to effect lifting of the chain and discontinuance of the trolley drive, and a pivoted stop member associated with said ramp members and adapted on actuation of the latter to be projected into the path of the load trolleys on the main track, means inter-connecting said pivoted actuating member with the set of control mechanisms nearest to said station and means interconnecting successive sets of control mechanisms to each other, the arrangement being such that on stoppage of a trolley at the station the pivoted actuating member will be moved to effect operation of the first set of control mechanism which will in turn effect operation of the next preceding set and so on thereby to arrest a number of trolleys at points preceding said station, removal of the trolley from said station resulting in return of the pivoted actuating member to its initial position with consequent restoration of the control mechanisms to their inoperative positions thereby to allow a drive to the trolleys previously arrested.

8. A conveyor system as claimed in claim 7 in which each pair of ramp members is carried by a linkage mechanism which is in turn operatively connected to the pivoted stop member, the linkage carrying the ramp members of the set of control mechanism nearest to the station being operatively connected to the pivoted actuating member at such station while the linkage carrying the ramp members of each preceding set of control mechanisms is operatively connected to a pivoted actuating member associated with the succeeding set and operable by a trolley arrested at such succeeding set.

9. A conveyor system as in claim 7 wherein resilient means are associated with each set of control mechanism to restore the ramp members and the pivoted stop member to their inoperative positions on movement of a trolley out of the path of the pivoted actuating member.

ARTHUR THOMAS CHARLES BURROWS.

REFERENCES CITED

The following references are of record in the file of this patent:

UNITED STATES PATENTS

| Number | Name | Date |
|---|---|---|
| 1,875,966 | Webb et al. | Sept. 6, 1932 |
| 2,234,620 | Botley | Mar. 11, 1941 |
| 2,344,155 | McBride et al. | Mar. 14, 1944 |